(12) United States Patent
Dinger

(10) Patent No.: US 10,107,358 B2
(45) Date of Patent: Oct. 23, 2018

(54) CENTRIFUGAL FORCE PENDULUM

(71) Applicant: Schaeffler Technologies AG & Co. KG, Herzogenaurach (DE)

(72) Inventor: Christian Dinger, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 134 days.

(21) Appl. No.: 15/111,120

(22) PCT Filed: Dec. 15, 2014

(86) PCT No.: PCT/DE2014/200714
§ 371 (c)(1),
(2) Date: Jul. 12, 2016

(87) PCT Pub. No.: WO2015/113540
PCT Pub. Date: Aug. 6, 2015

(65) Prior Publication Data
US 2016/0333961 A1    Nov. 17, 2016

(30) Foreign Application Priority Data
Jan. 28, 2014    (DE) .......................... 10 2014 201 449

(51) Int. Cl.
*F16F 15/14*    (2006.01)

(52) U.S. Cl.
CPC .................................. *F16F 15/145* (2013.01)

(58) Field of Classification Search
CPC .... F16F 15/14; F16F 15/1407; F16F 15/1414; F16F 15/1421; F16F 15/145; F16F 15/22
See application file for complete search history.

(56) References Cited

U.S. PATENT DOCUMENTS

| 9,726,254 | B2* | 8/2017 | Siemens | ................... F16F 7/10 |
| 2013/0233125 | A1 | 9/2013 | Jung et al. | |
| 2014/0013899 | A1 | 1/2014 | Krause et al. | |
| 2015/0176676 | A1* | 6/2015 | Dinger | .................. F16F 15/145 74/574.2 |
| 2017/0030430 | A1* | 2/2017 | Maienschein | ......... F16F 15/145 |

(Continued)

FOREIGN PATENT DOCUMENTS

| CN | 101120186 | 2/2008 |
| CN | 101498365 | 8/2009 |
| CN | 103119324 | 5/2013 |

(Continued)

*Primary Examiner* — Adam D Rogers
(74) *Attorney, Agent, or Firm* — Davidson, Davidson & Kappel, LLC

(57) ABSTRACT

A centrifugal pendulum for a drivetrain of a motor vehicle, which is mountable rotatably around an axis of rotation, having a pendulum mass, a first sliding block guide and a pendulum flange, where the pendulum mass includes a first pendulum mass part, where the first pendulum mass part is coupled with the pendulum flange via the first sliding block guide, where the first sliding block guide is designed to guide the first pendulum mass part along an oscillation path in an oscillating motion, where the pendulum mass has an additional pendulum mass part and a coupling, where the additional pendulum mass part is coupled with the first pendulum mass part by the coupling so that it is movable at least in the radial direction relative to the pendulum mass part.

20 Claims, 2 Drawing Sheets

(56) References Cited

U.S. PATENT DOCUMENTS

2017/0356523 A1* 12/2017 Uehara ............... F16F 15/1202

FOREIGN PATENT DOCUMENTS

| CN | 103459887 | | 12/2013 | | |
|----|-----------|---|---------|---|---|
| DE | 102008059297 | | 6/2009 | | |
| DE | 102010049930 | | 5/2011 | | |
| DE | 102015210200 | A1 * | 12/2015 | ............ | F16F 15/145 |
| DE | 102015213903 | A1 * | 1/2017 | ............ | F16F 15/131 |
| DE | 102015224242 | A1 * | 6/2017 | ............. | F16F 15/14 |
| DE | 102015224585 | A1 * | 6/2017 | ............ | F16F 15/131 |
| DE | 102016215134 | A1 * | 2/2018 | ............. | F16F 15/14 |
| WO | WO-2017054819 | A1 * | 4/2017 | | |

\* cited by examiner

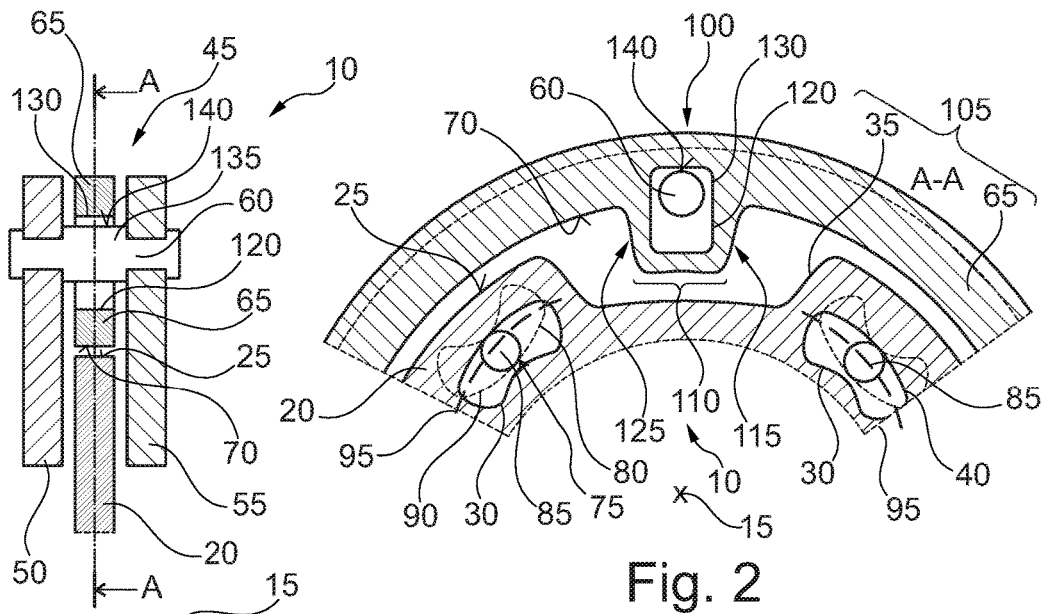
Fig. 1
Fig. 2
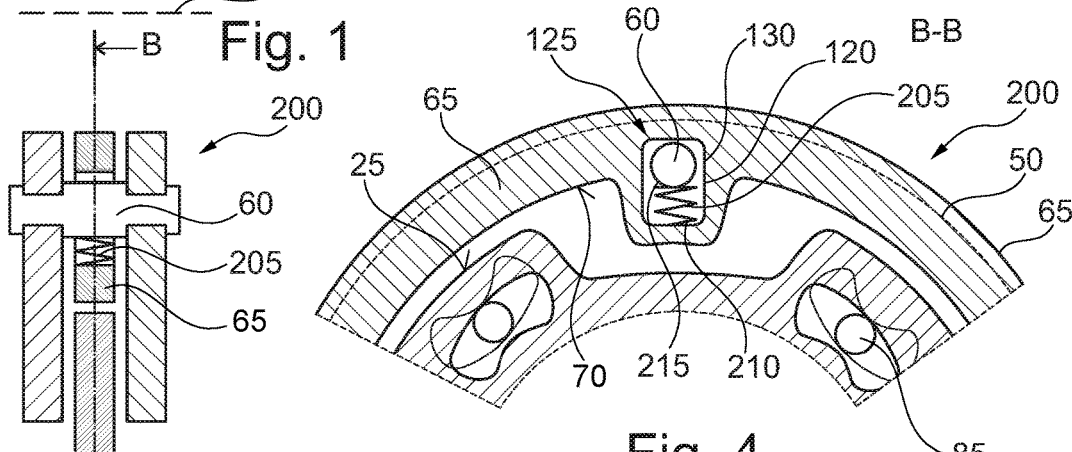
Fig. 3
Fig. 4
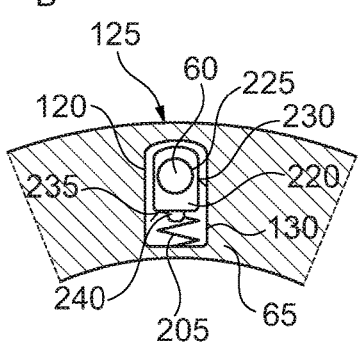
Fig. 5
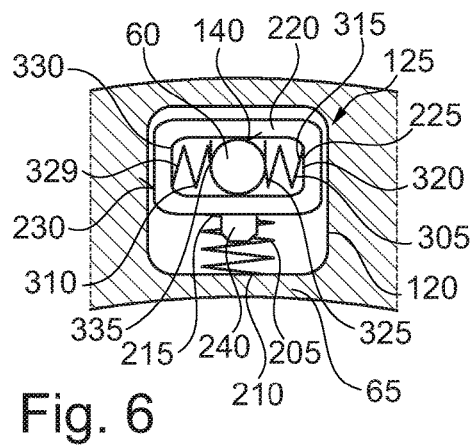
Fig. 6

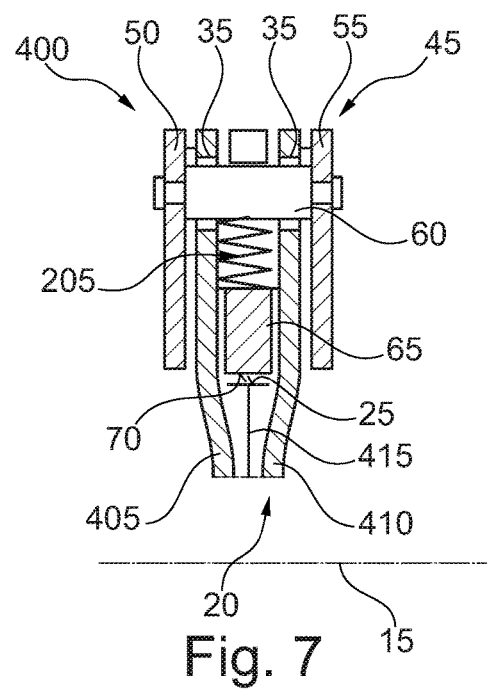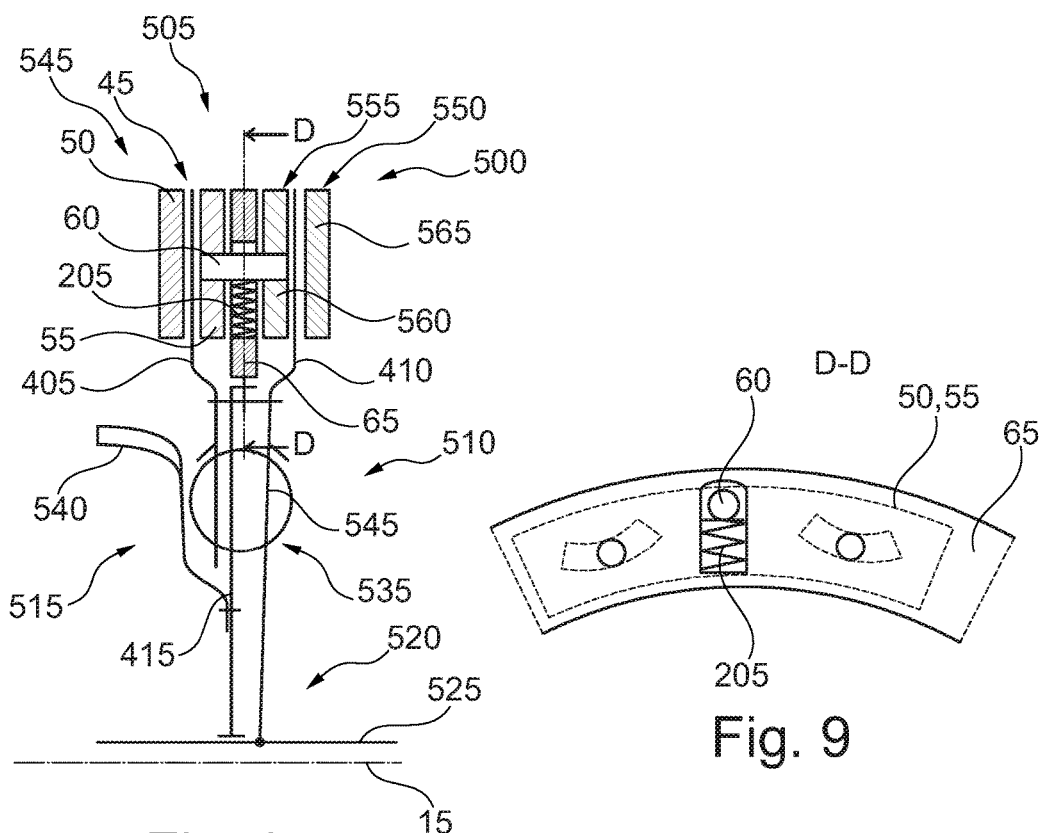

CENTRIFUGAL FORCE PENDULUM

The invention relates to a centrifugal pendulum.

BACKGROUND

Centrifugal pendulums having a pendulum flange and a pendulum mass are known. The pendulum mass is coupled with the pendulum flange by means of a sliding block guide. The sliding block guide establishes an oscillation path for the pendulum mass, along which the pendulum mass oscillates when torsional vibrations are introduced into the centrifugal pendulum. The return force to relocate the deflected pendulum mass back to a rest position again is dependent on a speed of rotation of the centrifugal pendulum and the mass of the pendulum mass. Usually, when designing centrifugal pendulums, the mass of the pendulum masses is increased to increase the return force at a predefined rotation speed. This results in an increase in the total mass of the centrifugal pendulum. Furthermore, additional construction space is needed to accommodate the enlarged pendulum mass.

SUMMARY OF THE INVENTION

It is an object of the present invention to provide an improved centrifugal pendulum.

According to the invention, it has been recognized that an improved centrifugal pendulum can be provided by the centrifugal pendulum having a pendulum mass, a first sliding block guide and a pendulum flange. The pendulum mass has a first pendulum mass part. The pendulum mass part is coupled with the pendulum flange by means of the first sliding block guide. The sliding block guide is designed to guide the pendulum mass part in an oscillating motion along an oscillation path. The pendulum mass also has an additional pendulum mass part and a coupling means. The additional pendulum mass part is movably coupled with the first pendulum mass part by the coupling means so that it is movable at least in the radial direction relative to the pendulum mass part.

This design has the advantage that the additional pendulum mass part may be designed as a ring, which requires no free space in order to provide movement in the circumferential direction, as required with conventional pendulum masses. All-in-all, the mass of the pendulum mass is increased here, so that a return force for relocating the first pendulum mass part from a deflected position back to a rest position can be increased. As a result, by means of the proposed centrifugal pendulum, torsional vibrations can be canceled out more effectively, or can be canceled out with greater torque.

In another embodiment, the coupling means has a second sliding block guide, the sliding block guide including a cutout and a means of guidance. The cutout is located in the additional pendulum mass part, and the means of guidance is coupled with the first pendulum mass part. Alternatively, the cutout is in the first pendulum mass part and the means of guidance is coupled with the additional pendulum mass part. The means of guidance meshes with the cutout and couples the additional pendulum mass with the first pendulum mass part. This makes it possible to provide an especially reliable coupling of the additional pendulum mass part with the first pendulum mass part. It is especially advantageous here if the cutout extends at least partially in the radial direction, preferably in a straight line from radially inside to outside.

In another embodiment, the coupling means includes a first clamping element. The first clamping element is positioned at least partially between the means of guidance and a cutout contour of the cutout, and tightens the additional pendulum mass part relative to the means of guidance. If the first pendulum mass part is deflected out of the rest position along the oscillation path, the means of guidance is also moved corresponding to the form of the oscillation path and the clamping element is tightened. This increases the return force to return the first pendulum mass part to the rest position, enabling torsional vibrations with elevated torque to be damped in a simple manner without a simultaneous increase of the mass of the centrifugal pendulum.

In another embodiment, the first clamping element has a first longitudinal end in contact with a longitudinal end of the cutout. A second longitudinal end of the first clamping element is in contact with the means of guidance. The first clamping element is preferably positioned radially to the inside of the means of guidance. This makes it possible to guarantee that the first clamping element may be designed, for example, as a coil spring, in particular as a compression spring, and thus that an especially cost-effective centrifugal pendulum can be provided.

In another embodiment, the means of guidance has a connecting pin and a guide element, the connecting pin being connected to the additional pendulum mass or to the first pendulum mass part. The guide element has a receptacle which is engaged by the connecting pin. The cutout has a cutout contour. The guide element has on its outer surface at least one guide surface facing the cutout contour. The guide surface is at least partially in contact with the cutout contour, in order to guide the connecting pin in the cutout. The receptacle is preferably of rectilinear design and/or is oriented essentially tangentially relative to the axis of rotation. In this way, noises of coupling the additional pendulum mass part with the first pendulum mass part can be avoided.

In another embodiment, a second clamping element is provided in the receptacle, the second clamping element being braced by a first longitudinal end on the receptacle and by a second longitudinal end on the connecting pin. The second clamping element is designed to tighten the guide element on the connecting pin. This makes it possible to return the first pendulum mass part to the rest position in a simple manner.

In another embodiment, the additional pendulum mass part is designed so that it is at least partially ring-shaped in the circumferential direction, making it possible to provide an especially high mass.

In another embodiment, the pendulum mass includes a second pendulum mass part, the first pendulum mass part and the second pendulum mass part being coupled, the additional pendulum mass part being positioned at least partially axially between the first and the second pendulum mass parts. In this way, it is possible to provide a compact construction of the centrifugal pendulum, especially in the axial direction.

In another embodiment, the pendulum flange includes a first and a second pendulum flange part. The first pendulum flange part and the second pendulum flange part are designed so that they run essentially parallel radially outward, adjoining the pendulum mass. Positioned axially between the first pendulum flange part and the second pendulum flange part is the additional pendulum mass part. This design also makes a compact construction possible, especially axially.

BRIEF DESCRIPTION OF THE DRAWINGS

The invention will be explained in greater detail below on the basis of figures. The figures show the following:

FIG. 1 a semi-longitudinal section through a centrifugal pendulum according to a first embodiment;

FIG. 2 a sectional view along a sectional plane A-A shown in FIG. 1, through the centrifugal pendulum shown in FIG. 1;

FIG. 3 a semi-longitudinal section through a centrifugal pendulum according to a second embodiment;

FIG. 4 a sectional view along a sectional plane B-B shown in FIG. 3, through the centrifugal pendulum shown in FIG. 3;

FIG. 5 an enlarged depiction of a sectional view through a means of guidance for the centrifugal pendulum shown in FIG. 4.

FIG. 6 a sectional view through a variant of the means of guidance shown in FIG. 5;

FIG. 7 a semi-longitudinal section through a centrifugal pendulum according to a third embodiment;

FIG. 8 a semi-longitudinal section through a damper device having a centrifugal pendulum according to a fourth embodiment;

FIG. 9 a cross section along a sectional plane D-D shown in FIG. 8, through the centrifugal pendulum shown in FIG. 8.

DETAILED DESCRIPTION

FIG. 1 shows a semi-longitudinal section through a centrifugal pendulum 10 according to a first embodiment; FIG. 2 shows a cross section along a sectional plane A-A shown in FIG. 1, through the centrifugal pendulum 10 shown in FIG. 1.

The centrifugal pendulum 10 is mounted so that it can rotate around an axis of rotation 15. The centrifugal pendulum 10 can be used here, for example, in a drivetrain of a motor vehicle, in particular in a torque transfer device and/or a torsional vibration damper. The centrifugal pendulum 10 includes a pendulum flange 20. In this case, the pendulum flange 20 extends essentially from radially inside to radially outside, perpendicular to the axis of rotation 15. The pendulum flange 20 has a bearing surface 25 on an outer circumferential surface, radially on the outside. Furthermore, the pendulum flange 20 has a first cutout 30 and a second cutout 35. The second cutout 35 is open radially toward the outside, while the first cutout is kidney-shaped and has a closed first cutout contour 40.

The centrifugal pendulum 10 also has a pendulum mass 45. The pendulum mass 45 has a first pendulum mass part 50 and a second pendulum mass part 55. The first pendulum mass part 50 is positioned in FIG. 1, for example, to the left on the front side of the pendulum flange 20. The second pendulum mass part 55 is positioned in FIG. 1, for example, to the right side of the pendulum flange 20. The first pendulum mass part 50 is connected to the second pendulum mass part 55 by means of a connecting pin 60. The connecting pin 60 is positioned, in this case, approximately parallel to the axis of rotation 15. Axially between the first pendulum mass part 50 and the second pendulum mass part 55, the pendulum mass 45 has an additional pendulum mass part 65. The pendulum mass 45 also has a coupling means 100, in order to couple the additional pendulum mass part 65 with the first pendulum mass part 50 and the second pendulum mass part 55.

The first pendulum mass part 50 and the second pendulum mass part 55 are coupled with the pendulum flange 20 by means of a first sliding block guide 75. For the first sliding block guide 75, the pendulum mass parts 50, 55 have a third kidney-shaped cutout 80, which is curved radially outward.

In the third cutout 80 and the first cutout 30, in addition, a guide roller 85 for the first sliding block guide 75 is provided, which reaches through the first cutout 30 and the third cutout 80. The guide roller 85 is in contact with the first cutout contour 40 of first cutout 30 and with a third cutout contour 90 of the third cutout 80, so that when torsional vibrations are introduced, for example from a reciprocating engine in which the pendulum mass parts 50, 55 are excited to oscillation in the circumferential direction, the first sliding block guide 75 guides the pendulum mass parts 50, 55 along an oscillation path 95.

The additional pendulum mass part 65 has a first ring section 105 and a coupling section 110. The coupling section 110 is located radially on the inner side of the ring section 105, and extends radially from outside to inside in the area of the second cutout 35 of the pendulum flange 20. The ring section 105 is in the form of a partial ring, and has a second bearing surface 70 radially on its inner side, whereby part of the inner side of the ring section 105 rests on the first bearing surface 25, in order to support the additional pendulum mass part 65 in the radial direction.

The coupling means 100 has a second sliding block guide 115. The second sliding block guide 115 has a fourth cutout 120, which has the form of an elongated hole and extends radially from inside to outside in the area of the coupling section 110. The fourth cutout 120 has the connecting pin 60 passing through it. The second sliding block guide 115 also has a means of guidance 125, which includes on the one hand a fourth cutout contour 130 of the fourth cutout 120 and on the other hand a section 135 of the connecting pin 60 positioned between the first pendulum mass part 50 and the second pendulum mass part 55. The second sliding block guide 115 guides the additional pendulum mass part 65 past a collision of a circumferential side 140 of section 135 of the connecting pin 60 with the fourth cutout contour 130 of the fourth cutout 120, so that the pendulum mass parts 50, 55 are movable radially relative to the additional pendulum mass part 65. In the circumferential direction, a movement of the pendulum mass parts 50, 55 is transferred to the additional pendulum mass part 65, and the latter is carried along in the movement of the pendulum mass parts 50, 55. This has the advantage in particular that in an oscillating motion along the oscillation path 95 the pendulum mass parts 50, 55, in addition to moving in the circumferential direction, can perform a radial movement relative to the pendulum flange 20 and the additional pendulum mass part 65. By the additional pendulum mass part 65 being carried along past the coupling means 100, the mass of the pendulum mass 45 can be increased, and thus greater torsional vibrations can be damped by the centrifugal pendulum 10 while the construction space remains the same.

Since the additional pendulum mass part 65 is carried along in the circumferential direction with the pendulum mass parts 50, 55, when the pendulum mass parts 50, 55 oscillate the additional pendulum mass part 65 also carries out a motion relative to the pendulum flange 20. In order to create appropriate free space for movement, the second cutout 35 is wider in the circumferential direction than the coupling section 110.

In FIGS. 1 and 2, the fourth cutout 120 is located in the additional pendulum mass part 65. it is of course also conceivable for the fourth cutout 120 to be located in the first and/or second pendulum mass part 50, 55, and for the connecting pin 60 to be connected to the additional pendulum mass part 65.

FIG. 3 shows a semi-longitudinal section through a centrifugal pendulum 200 according to a second embodiment.

FIG. 4 shows a detail of a cross section of the centrifugal pendulum 200 shown in FIG. 3, along a sectional plane B-B.

The centrifugal pendulum 200 is essentially identical in design to the centrifugal pendulum 10 shown in FIGS. 1 and 2. Differing from it, the centrifugal pendulum 200 has a first clamping element 205, which is positioned in the fourth cutout 120 of the second sliding block guide 115. In this case, the clamping element 205 is positioned axially between the first pendulum mass part 50 and the second pendulum mass part 55, radially to the outside of the pendulum flange 20. The first clamping element 205 is designed here as a coil spring. Other spring designs are of course also conceivable. The first clamping element 205 is braced at a first longitudinal end 210 radially to the inside of the fourth cutout contour 130 of the fourth cutout 120. A second longitudinal end 205 is braced radially to the outside on the connecting pin 60 in section 135, on the circumferential side 140 of the connecting pin 60.

If the pendulum mass parts 50, 55 are in a rest position, as shown schematically with dashed lines in FIG. 4, the clamping element 205 can be positioned, pre-tensioned or at its maximum radial extension, in the fourth cutout 120. The pendulum mass parts 50, 55 are in the rest position when the pendulum mass parts 50, 55 are at the greatest radial distance from the axis of rotation 15.

If a torsional vibration is introduced into the centrifugal pendulum 200, the pendulum mass parts 50, 55 are excited to torsional vibration. The pendulum mass parts 50, 55 oscillate phase-shifted relative to the torsional vibration, due to their mass inertia. The oscillating motion of the pendulum mass parts 50, 55 takes place in the circumferential direction. The oscillating motion of the pendulum mass parts 50, 55 is introduced in the circumferential direction into the additional pendulum mass part 65 via the coupling means 100, as described above. Furthermore, the pendulum mass parts 50, 55 move radially inward along the oscillation path 95. Because of the firm connection of the connecting pin 60 to the pendulum mass parts 50, 55, the connecting pin 60 is carried along. The connecting pin 60 presses against the clamping element 205 and tightens the clamping element 205 in the fourth cutout 120. The clamping element 205 here provides a spring force, which presses the connecting pin 60 radially outward and thus guides the pendulum mass parts 50, 55 back again along their oscillation path 95. The result of this is that the deflection of the pendulum mass parts 50, 55 is impeded by the clamping element 205, and thus the damping performance can be improved by means of the clamping element 205. Furthermore, by means of the clamping element 205 the return force on the pendulum mass parts 50, 55 can be increased, and thus the centrifugal pendulum 200 can be adapted in a simple way to higher torques during torsional vibration, without simultaneously increasing the weight of the centrifugal pendulum 200.

If centrifugal pendulums of known construction are compared to the centrifugal pendulum 200 shown in FIGS. 3 and 4, the weight of the centrifugal pendulum 200 can be reduced compared to known centrifugal pendulums by reducing the weight of the pendulum mass parts 50, 55. The return force can be partially provided by the clamping element 205, so that at high rotational speeds the first sliding block guide 75 is relieved of load in the rest position at high rotational speeds. The reason for this is that because of the reduced mass of the pendulum mass parts 50, 55 a reduced centrifugal force acts on the pendulum mass parts 50, 55, which can be braced on the first cutout contour 40 of the first cutout 30 by means of the guide rollers 85.

FIG. 5 shows an enlarged depiction of a sectional view through a means of guidance for the centrifugal pendulum 200 shown in FIG. 4. In order to improve a sliding contact between the connecting pin 60 and the fourth cutout contour 130 of the fourth cutout 120, a guide element 220 is provided, which is of elongated design on the circumferential side and has a receptacle 225 designed corresponding to section 135, through which the connecting pin 60 is passed. The guiding of the connecting pin 60 thus differs compared to FIG. 4, by a touching contact between an outer circumferential surface 230 of the guide element 220, which faces the fourth cutout contour 130 and serves as a guide surface, and the fourth cutout contour 130.

If the clamping element 205 has a significantly smaller extent in the circumferential direction than the extent of the fourth cutout 120, then advantageously on a lateral face 235 of the guide element 220 located radially on the inner side a securing element 240 is provided, which is designed as a projection protruding from the lateral face 235. The clamping element 205 clasps the securing element 240 circumferentially with its second longitudinal end 215, so that in this way the clamping element 205 is secured in the fourth cutout 120.

FIG. 6 shows a variation of the means of guidance 125 shown in FIG. 5. The means of guidance 125 is similar in design to the means of guidance 125 shown in FIG. 5. Differing from it, the receptacle 225 is wider tangentially than the connecting pin 60. The receptacle 225 has the form of an elongated hole running in the circumferential direction, and is of rectilinear design. In the receptacle 225, in addition to the connecting pin 60, is a second clamping element 305, which is positioned in FIG. 6, for example, to the right side of the clamping pin 60, and a third clamping element 310, which is positioned in FIG. 6 to the left side of the connecting pin 60 in the receptacle 225. A first longitudinal end 315 of the second clamping element 305 rests against a first longitudinal end 320 of the receptacle 225. A second longitudinal end 325 of the second clamping element 305 rests against the circumferential side 140 of the connecting pin 60. A first longitudinal end 329 of the third clamping element 310 rests against a second longitudinal end 330 of the receptacle 225, which lies opposite the first longitudinal end 320. A second longitudinal end 335 of the third clamping element 310 rests against the circumferential side 140 of the connecting pin 60. Preferably, the second clamping element 305 and the third clamping element 310 are positioned in the receptacle 225 with the same pre-tensioning. This guarantees that the connecting pin 60 is essentially centered in the receptacle 225. The pre-tensioning prevents the circumferential side 140 from striking the longitudinal ends 320, 330 of the receptacle 225 when the pendulum mass parts 50, 55 are moved out of the rest position, and prevents the additional pendulum mass part 65 from being carried along by means of the second sliding block guide 115, making it possible to prevent additional clattering noises.

FIG. 7 shows a semi-longitudinal section through a centrifugal pendulum 400 according to a third embodiment. The centrifugal pendulum 400 is similar in design to the centrifugal pendulum 200 shown in FIGS. 3 and 4. Differing therefrom, the pendulum flange 20 has a first pendulum flange part 405 and a second pendulum flange part 410. The first and second pendulum flange parts 405, 410 are passed radially from inside to outside adjacent to the pendulum mass parts 50, 55, essentially perpendicular to the axis of rotation 15. The first pendulum mass part 50 is positioned to the left side of the first pendulum flange part 405 and the second pendulum mass part 55 is positioned to the right side of the second pendulum flange part 410. The additional pendulum mass part 65 is positioned between the pendulum flange parts 405, 410 in the axial direction. The connecting pin 60 extends in the axial direction parallel to the axis of rotation 15 and connects the first pendulum mass part 50 to the second pendulum mass part 55, and in so doing reaches through the pendulum flange parts 405, 410 by means of the second cutout 35. The second cutout 35 is closed radially toward the outside. It is of course also conceivable for the second cutout 35 to be open radially toward the outside, as shown in FIGS. 2 and 4.

In order to ensure that the additional pendulum mass part 65 is supported, between the first pendulum flange part 405 and the second flange part 410 in the axial direction a plate piece 415 is provided, on which the first bearing surface 25 is located radially on the outer surface, on which the additional pendulum mass part 65 is supported radially by means of the inner circumferential surface or the second bearing surface 70. As shown later in FIG. 8, the plate piece 415 may be part of a damper device 500, which is designed, for example, as shown in FIG. 8. The configuration of the centrifugal pendulum 400 shown in FIG. 7 has the advantage that the additional pendulum mass part 65 may have especially high masses, while the pendulum mass parts 50, 55 on the other hand have an especially low mass. This makes it possible for the clamping element 205 to produce an especially high clamping force relative to the mass of the pendulum mass parts 50, 55. At the same time, tipping of the pendulum mass parts 50, 55 during the oscillation motion is reliably prevented. Support of the additional pendulum mass part 65 is also reliably ensured.

FIG. 8 shows a semi-longitudinal section of the schematic depiction of a damper device 500 having a centrifugal pendulum 505 according to a fourth embodiment. FIG. 9 shows a cross section along a sectional plane D-D shown in FIG. 8, through the centrifugal pendulum 505 shown in FIG. 8.

In addition to the centrifugal pendulum 505, the damper device 500 has a damper 510 positioned radially to the inside of the centrifugal pendulum 505. The damper device 500 has an input side 515 located on the left side and an output side 520 located on the right side. The torque transfer device 500 is rotatable around the axis of rotation 15. The output side 520 is connected to an output shaft 525. The output side 525 may be connected to a transmission input shaft. The input side 515 may be connected, for example, to a reciprocating engine. It is of course also conceivable for the input side 515 and the output side 520 to be exchanged. The output shaft 525 would then be an input shaft, which would come, for example, from a reciprocating engine.

The damper 510 has a retainer 530 and an energy storage element 535 which is located in the retainer 530. The energy storage element 535 is designed, for example, as a bow spring; it runs essentially in the circumferential direction and is connected by a first longitudinal end 210 to the damper input side. The damper has on its input side 515 an input side flange 540, which is supported rotatably on the output shaft 525.

The centrifugal pendulum 505 is designed as a dual centrifugal pendulum. In this case, the centrifugal pendulum 505 includes a first pendulum device 545 and a second pendulum device 550. The centrifugal pendulum 505 is positioned radially to the outside of the damper 510. The centrifugal pendulum 505 may of course also be positioned differently. The first centrifugal pendulum device 545 is positioned axially adjacent to the second centrifugal pendulum device 550. The first centrifugal pendulum device 545 includes the first pendulum flange part 405 and the second centrifugal pendulum device 550 includes the second pendulum flange part 410. The first pendulum flange part 405 and the second pendulum flange part 410 are coupled with each other radially to the inside of the additional pendulum mass part 65. The plate part 415 is positioned between the first pendulum flange part 405 and the second pendulum flange part 410 in the axial direction. The damper input part 540 is connected to the plate part 415 radially to the inside of the second pendulum flange part 410.

The first centrifugal pendulum device 545 has the first pendulum mass 45. The second pendulum device 550 has a second pendulum mass 555, which is designed analogously to the first pendulum mass 45 and has a first pendulum mass part 560 positioned to the left side of the second pendulum flange part 410 and a second pendulum mass part 565 positioned to the right side of the second pendulum flange part 410. The second pendulum mass part 55 of the pendulum mass 45 and the first pendulum mass part 560 of the additional pendulum mass 555 are connected by means of the connecting pin 60, and are positioned on both sides of the first pendulum flange part 405. It is of course also conceivable for the connecting pin 60 to connect together all or only part of the pendulum mass parts 50, 55, 560, 565. In this case, the additional pendulum mass part 65 is at the same time part of the pendulum mass 45 of the first centrifugal pendulum device 545 and part of the pendulum mass 555 of the second centrifugal pendulum device 550.

As explained already in FIGS. 3 and 4, the clamping element 205 clamps the connecting pin 60 in relation to the additional pendulum mass part 65 and the plate part 415. This makes it possible to increase a return force for returning the pendulum mass parts 50, 55, 560, 565. It is of course also conceivable to dispense with the clamping element 205, as explained already in FIGS. 1 and 2.

It is of course also conceivable for the configuration shown in FIGS. 8 and 9 to also be designed without the damper 510. It is also conceivable for the damper 510 to be combined with one of the centrifugal pendulums 10, 200, 400 shown in FIGS. 1 through 7. It is also conceivable for the centrifugal pendulum 505 to be positioned on a different component of a torque transfer device, for example on a turbine of a converter.

REFERENCE LABELS 10 centrifugal pendulum
15 axis of rotation
20 pendulum flange
25 bearing surface
30 first cutout
35 second cutout
40 first cutout contour
45 pendulum mass
50 first pendulum mass part
55 second pendulum mass part
60 connecting pin
65 additional pendulum mass part
70 second bearing surface
75 first sliding block guide
80 third cutout
85 guide roller
90 third cutout contour
95 oscillation path
100 coupling means
105 ring section 110 coupling section
115 second sliding block guide
120 fourth cutout
125 means of guidance
130 fourth cutout contour
135 Section
140 circumferential side
200 centrifugal pendulum
205 clamping element
210 first longitudinal end
215 second longitudinal end
220 guide element
225 Receptacle
230 outer circumferential surface
235 conductor surface
240 securing element
305 second clamping element
310 third clamping element
315 first longitudinal end of the second clamping element
320 first longitudinal end of the receptacle
325 second longitudinal end of the second clamping element
329 first longitudinal end of the third clamping element
330 second longitudinal end of the receptacle
335 second longitudinal end of the third clamping element
400 centrifugal pendulum
405 first pendulum flange part
410 second pendulum flange part
415 plate part
500 damper device
505 centrifugal pendulum
510 Damper
515 input side
520 output side
525 output shaft
530 Retainer
535 energy storage element
540 damper input part
545 first centrifugal pendulum device
550 second centrifugal pendulum device
555 pendulum mass
560 first pendulum mass part
565 second pendulum mass part

What is claimed is:

1. A centrifugal pendulum for a drivetrain of a motor vehicle, the centrifugal pendulum mountable rotatably around an axis of rotation, and comprising:
a pendulum mass;
a first sliding block guide; and
a pendulum flange,
the pendulum mass including a first pendulum mass part on a first axial side of the pendulum flange and a second pendulum mass part on a second axial side of the pendulum flange, the first pendulum mass part and the second pendulum mass part being coupled with the pendulum flange by the first sliding block guide, the first sliding block guide configured for guiding the first pendulum mass part and the second pendulum mass part in an oscillating motion along a path of oscillation, the pendulum mass having an additional pendulum mass part and a coupling,
the additional pendulum mass part coupled with the first pendulum mass part and the second pendulum mass part by the coupling so that the additional pendulum mass part is movable at least in a radial direction relative to the first pendulum mass part and the second pendulum mass part, the additional pendulum mass part being axially between the first pendulum mass part and the second pendulum mass part, the additional pendulum mass part being coupled to the pendulum flange by the first pendulum mass part and the second pendulum mass part.

2. The centrifugal pendulum as recited in claim 1 wherein the coupling means has a second sliding block guide including a cutout and a guide, wherein the cutout is located in the additional pendulum mass part and the guide is coupled with the first pendulum mass part, or the cutout is located in the first pendulum mass part and the guide is coupled with the additional pendulum mass part, wherein the guide engages the cutout and couples the additional pendulum mass part with the first pendulum mass part.

3. The centrifugal pendulum as recited in claim 2 wherein the cutout extends at least partially in the radial direction.

4. The centrifugal pendulum as recited in claim 3 wherein the cutout extends in a straight line from radially inside to radially outside.

5. The centrifugal pendulum as recited in claim 2 wherein the coupling includes a first clamping element, the first clamping element positioned at least partially between the guide and a cutout contour of the cutout and tightens the additional pendulum mass part relative to the guide.

6. The centrifugal pendulum as recited in claim 5 wherein the first clamping element has a first longitudinal end in contact with a longitudinal end of the cutout and a second longitudinal end in contact with the guide.

7. The centrifugal pendulum as recited in claim 6 wherein the first clamping element is positioned to an inside of the guide.

8. The centrifugal pendulum as recited in claim 2 wherein the guide of the second sliding block guide includes a section of a connecting pin and a guide element, the connecting pin connected to the additional pendulum mass part or to the first pendulum mass part, the guide element having a receptacle engaged by the connecting pin, the cutout having a cutout contour, the guide element having on an outer surface at least one guide surface facing the cutout contour, the guide surface at least partially in contact with the cutout contour, in order to guide the connecting pin in the cutout.

9. The centrifugal pendulum as recited in claim 8 wherein the receptacle is of rectilinear design or extends tangentially relative to the axis of rotation.

10. The centrifugal pendulum as recited in claim 8 wherein a second clamping element is provided in the receptacle, the second clamping element being braced on the receptacle by a first longitudinal end and braced on the connecting pin by a second longitudinal end, the second clamping element being configured for tightening the guide element on the connecting pin.

11. The centrifugal pendulum as recited in claim 1 wherein the additional pendulum mass part being at least partially ring-shaped in a circumferential direction.

12. The centrifugal pendulum as recited in claim 1 wherein the pendulum flange includes a first and a second pendulum flange part, the first pendulum flange part and the second pendulum flange part running essentially parallel radially outward, adjoining the pendulum mass, the additional pendulum mass part being positioned axially between the first pendulum flange part and the second pendulum flange part.

13. The centrifugal pendulum as recited in claim 1 wherein the coupling has a second sliding block guide including a cutout formed in the additional pendulum mass part and a guide received in the cutout, the cutout being radially wider than the guide such that the guide is radially movable within the cutout.

14. The centrifugal pendulum as recited in claim 1 wherein an inner circumferential surface of the additional pendulum mass part is radially outside of an outer circumferential surface of the pendulum flange.

15. A centrifugal pendulum for a drivetrain of a motor vehicle, the centrifugal pendulum mountable rotatably around an axis of rotation, and comprising:
   a pendulum mass;
   a first sliding block guide; and
   a pendulum flange,
   the pendulum mass including a first pendulum mass part coupled with the pendulum flange by the first sliding block guide, the first sliding block guide configured for guiding the first pendulum mass part in an oscillating motion along a path of oscillation, the pendulum mass having an additional pendulum mass part and a coupling,
   the additional pendulum mass part coupled with the first pendulum mass part by the coupling so that the additional pendulum mass part is movable at least in a radial direction relative to the first pendulum mass part,
   wherein the coupling has a second sliding block guide including a cutout and a guide, where the cutout is located in the additional pendulum mass part and the guide is coupled with the first pendulum mass part, or the cutout is located in the first pendulum mass part and the guide is coupled with the additional pendulum mass part, wherein the guide engages the cutout and couples the additional pendulum mass part with the first pendulum mass part,
   wherein the coupling includes a first clamping element, the first clamping element positioned at least partially between the guide and a cutout contour of the cutout and tightens the additional pendulum mass part relative to the guide.

16. The centrifugal pendulum as recited in claim 15 wherein the first clamping element has a first longitudinal end in contact with a longitudinal end of the cutout and a second longitudinal end in contact with the guide.

17. The centrifugal pendulum as recited in claim 16 wherein the first clamping element is positioned to an inside of the guide.

18. A centrifugal pendulum for a drivetrain of a motor vehicle, the centrifugal pendulum mountable rotatably around an axis of rotation, and comprising:
   a pendulum mass;
   a first sliding block guide; and
   a pendulum flange,
   the pendulum mass including a first pendulum mass part coupled with the pendulum flange by the first sliding block guide, the first sliding block guide configured for guiding the first pendulum mass part in an oscillating motion along a path of oscillation, the pendulum mass having an additional pendulum mass part and a coupling,
   the additional pendulum mass part coupled with the first pendulum mass part by the coupling so that the additional pendulum mass part is movable at least in a radial direction relative to the first pendulum mass part,
   wherein the coupling has a second sliding block guide including a cutout and a guide, where the cutout is located in the additional pendulum mass part and the guide is coupled with the first pendulum mass part, or the cutout is located in the first pendulum mass part and the guide is coupled with the additional pendulum mass part, wherein the guide engages the cutout and couples the additional pendulum mass part with the first pendulum mass part,
   wherein the guide of the second sliding block guide includes a section of a connecting pin and a guide element, the connecting pin connected to the additional pendulum mass part or to the first pendulum mass part, the guide element having a receptacle engaged by the connecting pin, the cutout having a cutout contour, the guide element having on an outer surface at least one guide surface facing the cutout contour, the guide surface at least partially in contact with the cutout contour, in order to guide the connecting pin in the cutout.

19. The centrifugal pendulum as recited in claim 18 wherein the receptacle is of rectilinear design or extends tangentially relative to the axis of rotation.

20. The centrifugal pendulum as recited in claim 18 wherein a second clamping element is provided in the receptacle, the second clamping element being braced on the receptacle by a first longitudinal end and braced on the connecting pin by a second longitudinal end, the second clamping element being configured for tightening the guide element on the connecting pin.

* * * * *